J. DE ANGELIS.
TROLLEY POLE.
APPLICATION FILED JAN. 15, 1915.
1,140,126.
Patented May 18, 1915.
3 SHEETS—SHEET 1.
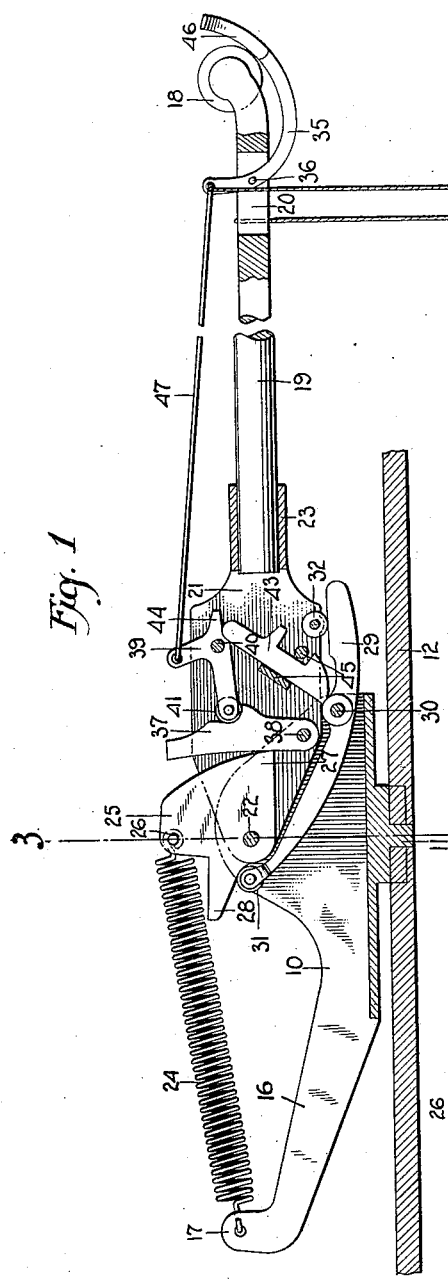
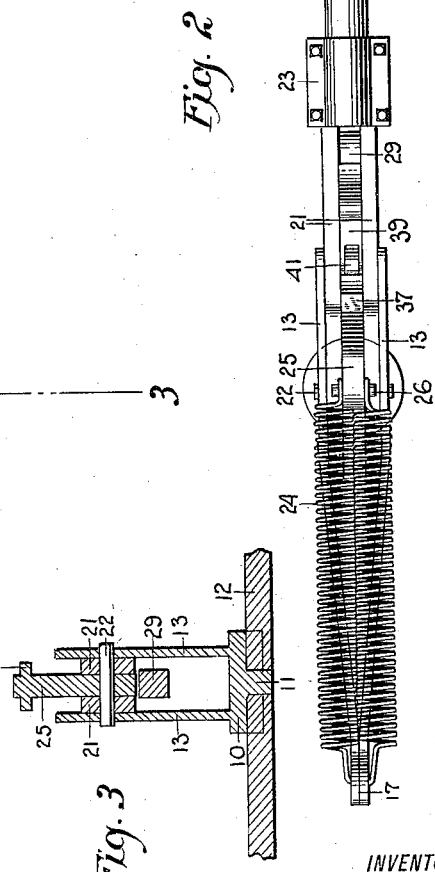
WITNESSES:
INVENTOR
John De Angelis
BY
ATTORNEYS

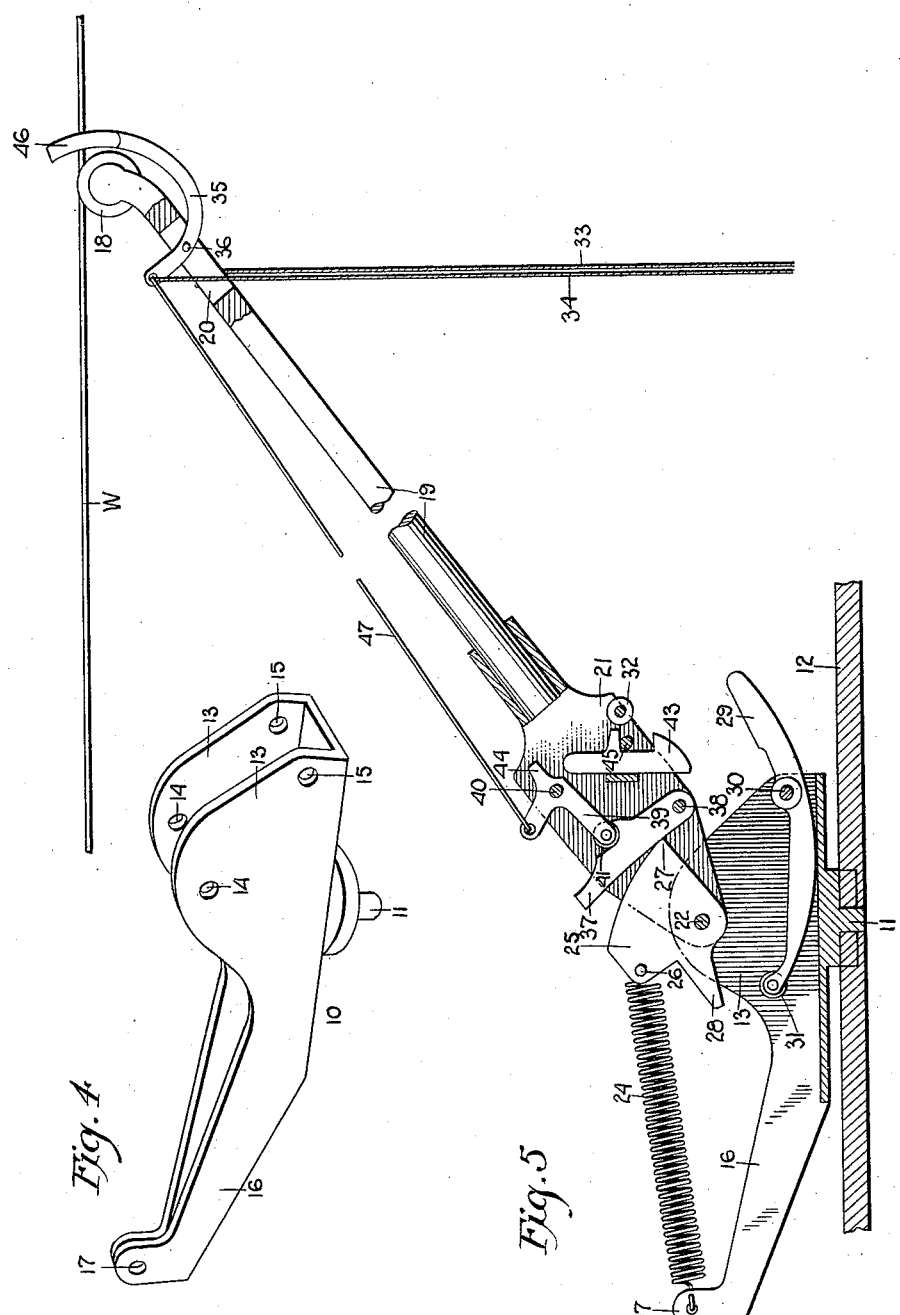
J. DE ANGELIS.
TROLLEY POLE.
APPLICATION FILED JAN. 15, 1915.
1,140,126.
Patented May 18, 1915.
3 SHEETS—SHEET 2.
WITNESSES:
INVENTOR
John De Angelis
BY
ATTORNEYS

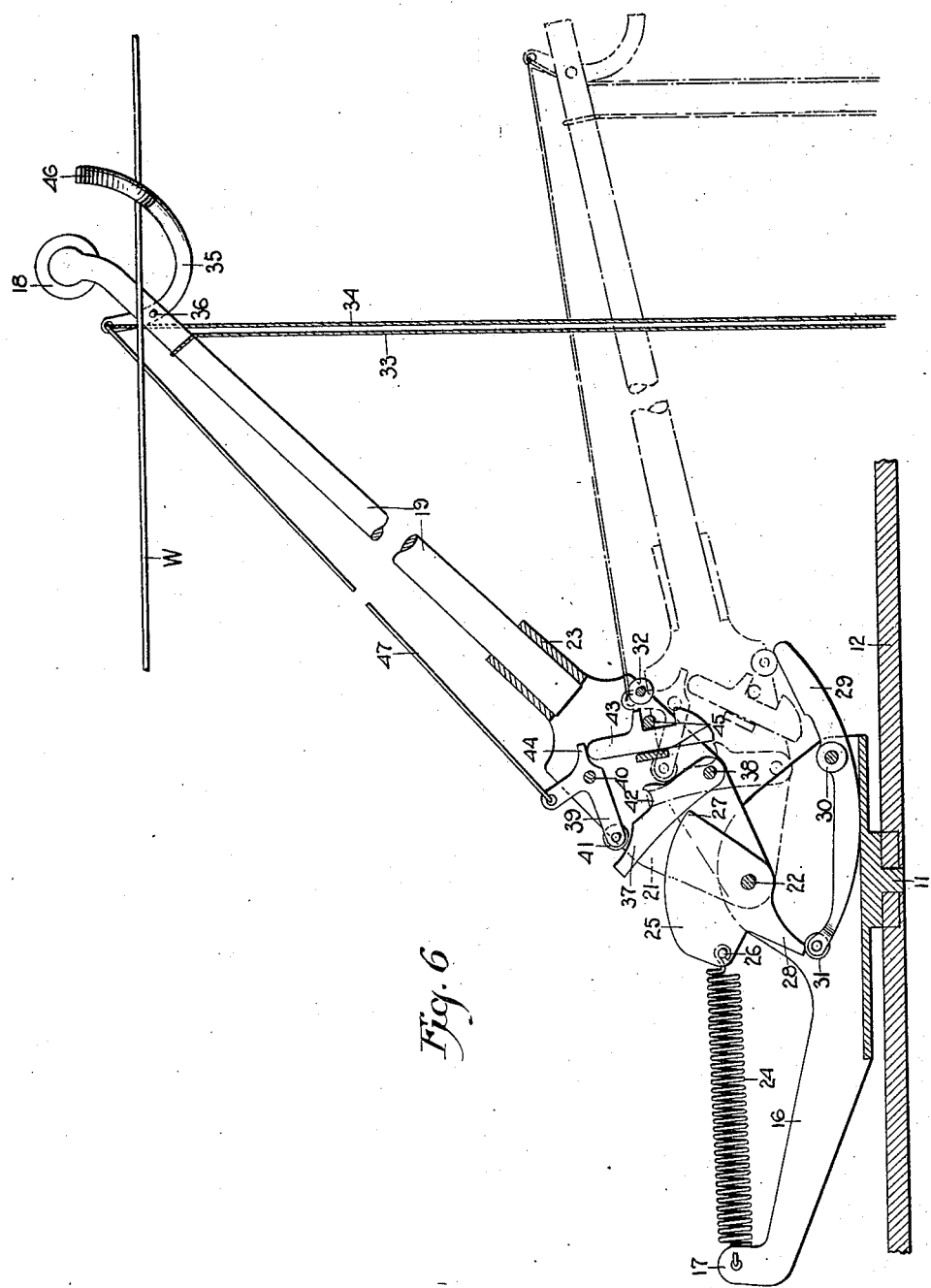

UNITED STATES PATENT OFFICE.

JOHN DE ANGELIS, OF MOUNT VERNON, NEW YORK.

TROLLEY-POLE.

1,140,126.   Specification of Letters Patent.   Patented May 18, 1915.

Application filed January 15, 1915. Serial No. 2,372.

*To all whom it may concern:*

Be it known that I, JOHN DE ANGELIS, a citizen of the United States, and a resident of Mount Vernon, in the county of Westchester and State of New York, have invented a new and Improved Trolley-Pole, of which the following is a full, clear, and exact description.

This invention relates to trolley poles for electric railway cars or the like, and has particular reference to means for facilitating the engagement between the trolley and the overhead wire and also means of an improved nature to prevent damage to the pole or any other mechanism in the event of the trolley leaving the wire while in use.

Among the objects of the invention, therefore, is to provide a mechanism of a simple and reliable nature for connecting the pole to the turntable whereby the pole will be resiliently supported for normal connection with the wire when so desired, but will be dropped into a safe position by the release of the connecting devices when the trolley leaves the wire.

A further object of the invention is to provide an attachment for the upper end of the trolley pole which serves not only to cause the disconnection of the locking devices so that the pole may drop as above stated, but which will serve as a guiding means to direct the trolley to the wire under the operation of the operator.

The foregoing and other objects of the invention will hereinafter be more fully described and claimed and illustrated in the drawings forming a part of this specification in which like characters of reference indicate corresponding parts in all the views, and in which—

Figure 1 is a side elevation, partly in section, of a preferred embodiment of my invention with the parts in the position indicated at the time the operator is drawing down upon the trolley end of the pole; Fig. 2 is a plan view of the same; Fig. 3 is a vertical transverse section on the line 3—3 of Fig. 1; Fig. 4 is a perspective view of the truntable; Fig. 5 is a view corresponding to Fig. 1 but with the parts in running position; and Fig. 6 is a similar view but indicating in full lines the position of the parts just after the trolley has left the wire, the locking mechanism being just released, and showing in dotted lines the position to which the trolley pole immediately thereafter falls.

The several parts of this device may be made of any suitable materials, and the relative sizes and proportions, as well as the general design of the mechanism may be varied to a considerable extent without departing from the spirit of the invention hereinafter more fully described and specifically claimed.

Referring more particularly to the drawings I show at 10 a turntable journaled as heretofore for rotation around a vertical axis 11 on the top of the car 12. Fig. 4 indicates best the general construction of the turntable, the same comprising two substantially parallel side plates 13 extending vertically from the base of the turntable and provided with alined transverse pivot holes 14 and 15. At the front ends the side plates merge into an arm 16 having an attachment lug 17 at its free end.

The trolley wheel 18 is journaled as usual in the upper or free end of the pole 19 and may have any usual or approved electrical connections (not shown) therethrough. The pole just below the trolley is provided with a longitudinal slot 20. The lower end of the pole 19 is secured to a pair of spaced parallel plates 21 mounted in vertical planes between the side plates 13 of the turntable and movable vertically in said plates around a pivot pin 22 fixed in the holes 14. The connection between the pole and these plates is shown through a clamp 23.

At 24 I show a strong spring having one end connected to the lug 17 at the front end of the turntable and serving through suitable connections at its other end to normally sustain the trolley 18 resiliently against the lower surface of the wire. The means for making this effective connection between the sustaining spring and the trolley pole includes a series of movable devices mounted between and below the plates 21. Among these devices is an anchor member 25 pivoted between the plates 21 on the pivot 22, the rear end of the spring being connected thereto at 26 above the pivot. The normal tendency of the spring is to cause the anchor member to swing upwardly and forwardly around its pivot. The rear edge of the anchor member is formed preferably on the arc of a circle having its center on the opposite side of the pivot 22 and said edge terminates in a point 27 at a distance farther from the center of the pivot 22 than the length of a line drawn directly from the pivot to the curved edge. At the front portion of the anchor member is formed a forwardly projecting finger 28.

At 29 is a lever of the first class journaled on a pivot 30 connected in the holes 15 of the side plates 13 and below the plates 21. The front end of the lever 29 bears through an anti-friction roller 31 upon the lower surface of the finger 28. When the rear end of the lever is depressed by a downward pull upon the upper end of the trolley pole, the contact between the trolley pole and the lever being through an anti-friction roller 32 running upon the upper surface of said rear end of the lever. The trolley pole may be drawn downwardly by the operator by a pull upon either of the cords 33 or 34, the former connected directly to the pole and the latter being connected to the front of the short arm of a yoke lever 35 pivoted at 36 in said pole slot 20. When the pole is drawn downwardly as thus described, with sufficient force for the front end of the lever 29 to lift the finger 28 and rotate the anchor member in a clockwise direction around its pivot, the point 27 of the anchor member will be drawn downwardly below the horizontal plane of the pivot 22 and the anchor member will then be locked in such position by an abutment member 37 pivoted at 38 between the plates 21 and held from rotation on said pivot by means of a bell crank trigger 39 pivoted at 40 between the upper portions of the plates. The front or forwardly extending arm of the bell crank trigger carries an anti-friction roller 41 which engages in a pocket 42 in the rear portion of the abutment, the trigger being moved into this position by the engagement of the upper end of a sliding bolt 43 with the tail 44 of the trigger when the opposite end of the bolt is in engagement with the hub of the lever 29. In other words, when the pole is pulled down forcibly, the action of the roller 32 upon the rear end of the lever 29 causes the roller 31 to turn the anchor member so as to bring the point 27 into locking position, and simultaneously therewith or immediately following such action the bolt 43, by acting against the rearwardly extending tail 44 of the trigger, causes it and the abutment member to swing into position for the abutment to lock the anchor and the trigger to lock the abutment from movement in the opposite direction. The tendency of the spring 24 thereafter is to elevate the pole and trolley, the locking mechanism remaining in a solid condition in the position shown in Fig. 5. The point 27 of the anchor member by contact with the abutment prevents the movement of the anchor member with relation to the abutment, and since the forward arm of the bell crank trigger has passed beyond the dead center into the pocket 42, the abutment cannot swing in a clockwise direction around its pivot 38 until the trigger is pulled. The sliding bolt 43 is movable between keepers 45 so as not to prevent the desired pulling of the trigger. The pole, as thus arranged with the locking mechanism in locked position, may operate and be manipulated by the cords 33 and 34 and the spring 24 the same as any other trolley pole.

The yoke lever 35 is provided at its rear end with a pair of diverging horns 46 which extend to any desired distance on opposite sides of the wire W, but the crotch of the yoke is normally below and out of contact with the wire. When, however, the trolley leaves the wire, the force of the spring 24 will cause the pole to swing upwardly as shown in Fig. 6, causing the wire to be received in the crotch of the yoke and causing the lever 35 to swing in a clockwise direction relatively to the pole and the front arm of the lever to pull the trigger out of locking position through any suitable rod or cord connection 47 between said short arm of the lever and the upwardly extending arm of the bell crank trigger. When the connection, therefore, between the locking devices is broken as shown in Fig. 6, the pole is free to drop downwardly around the pivot 22 until the roller 32 strikes the lever 29. This lever, however, being free to rock around its pivot 30, the force of the impact is cushioned by the spring 24, since the roller 31 at the front end of the lever is at such time in engagement with the finger 28 of the anchor member.

I claim:—

1. In a device of the kind set forth, the combination with a turntable having a pair of spaced vertical side plates and a forwardly extending arm, of a pole pivoted between said plates for free movement in a vertical plane, an anchor member pivoted upon the same pivot as the pole and adapted to move around said pivot independently of the pole, a spring having its ends connected respectively to said arm and said anchor member, and locking devices connected to the lower end of the trolley pole serving to prevent movement of the anchor member relatively to the pole whereby the force of the spring tends to lift the pole.

2. In a device of the character set forth, the combination of a turntable, a trolley pole mounted on a horizontal pivot on the turntable and adapted to move freely with respect thereto in a vertical plane, a lever pivoted to the turntable below the pole, an anchor member pivoted upon the same pivot as the pole and adapted to rotate on its pivot independently of the movement of the pole, said lever coöperating with the anchor member in front of its pivot when the pole is down, a spring acting between the front portion of the turntable and the upper portion of the anchor member tending to elevate the pole, and locking devices serving to prevent the rotation of the anchor member independently of the pole.

3. In a trolley pole construction, the combination of a turntable, a pole pivoted at its lower end to the turntable and adapted to move freely around its pivot in a vertical plane, an anchor member pivoted on the same pivot as the pole and adapted to move independently thereof around said pivot, a supporting spring extending between the front portion of the turntable and the upper portion of the anchor member and tending to lift the pole, means to lower the upper end of the pole, means carried by the turntable serving to move the anchor member into locking position, and trigger devices made effective by said downward movement of the pole to lock the anchor member in fixed position with respect to the pole.

4. In a device of the character set forth, the combination with a turntable having a forward extension, of a pole pivoted to the turntable for free moveemnt in a vertical plane, a lever of the first class pivoted to the turntable below the pole, means to draw the pole downwardly into engagement with the rear end of the lever thereby lifting the front end of the lever, an anchor member pivoted adjacent the lower end of the pole and adapted to turn on its pivot independently of the pole, said front end of the lever serving when elevated to rotate the anchor member in a certain direction, a spring extending between the forward extension of the turntable and the anchor member and tending to swing the anchor member in the opposite direction, and locking devices carried by the pole to prevent the force of the spring to turn the anchor member independently of the movement of the pole.

5. In a device of the kind set forth, the combination with a turntable having a forward extension, of a pole pivoted at its lower end to the turntable, an anchor member pivoted on the same pivot as the pole and adapted to move independently thereof around its pivot, a spring extending between the extension of the turntable and the anchor member and tending to lift the anchor member, means to lower the pole, means carried by the turntable and adapted when the pole is lowered forcibly to cause the movement of the anchor member against the force of the spring, and locking devices carried by the pole serving to set the anchor member rigidly with respect to the pole when so moved, said locking devices including an abutment member contacting with the anchor member and a trigger member movably preventing the movement of the abutment.

6. In a device of the kind set forth, the combination with a turntable having a forward extension, of a pole having a pair of spaced parallel plates pivoted to the turntable, said pole being movable freely around its pivot in a vertical plane, an anchor member pivoted coaxially with the pole and adapted to move independently thereof around its pivot between said plates, a spring extending between the forward extension of the turntable and the upper portion of the anchor member, said spring tending to turn the anchor member in an upward and forward direction, a lever of the first class pivoted to the turntable below the pole plates, means to lower the pole forcibly into engagement with the rear end of the lever causing the front end of the lever to turn the anchor member rearwardly, and trigger mechanism pivoted between said pole plates and serving to lock the anchor member in fixed position with respect to the pole after being turned rearwardly.

7. The combination with a turntable, of a trolley pole pivoted to the turntable for free movement in a vertical plane, an anchor member pivoted adjacent the pivoted end of the pole, cushioning means acting between the turntable and said anchor member tending to swing the anchor member upwardly and forwardly, means to lower the pole forcibly, means connected to the turntable and acted upon by the pole when thus forced downwardly serving to turn the anchor member rearwardly against the force of said cushioning means, locking means carried by the pole serving to lock the anchor member when turned rearwardly so as to be held immovable with respect to the pole, said locking means including a bell crank trigger, and a yoke lever connected to the upper end of the pole and extending laterally on both sides of the wire and connected to the trigger whereby when the trolley leaves the wire the trigger will be pulled, allowing the pole to be dropped freely.

In testimony whereof I have signed my name to this specification in the presence of two subscribing witnesses.

JOHN DE ANGELIS.

Witnesses:
 EDWARD REYNAUD,
 COLIN MACKENZIE.